US010147287B2

(12) United States Patent
Bamba

(10) Patent No.: US 10,147,287 B2
(45) Date of Patent: Dec. 4, 2018

(54) IMAGE PROCESSING APPARATUS TO SET A DETECTION LINE USED TO COUNT THE PASSING NUMBER OF MOVING OBJECTS

(71) Applicant: CANON KABUSHIKI KAISHA, Tokyo (JP)

(72) Inventor: Yasuo Bamba, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 162 days.

(21) Appl. No.: 15/222,451

(22) Filed: Jul. 28, 2016

(65) Prior Publication Data

US 2017/0039728 A1 Feb. 9, 2017

(30) Foreign Application Priority Data

Aug. 4, 2015 (JP) ................................ 2015-154487

(51) Int. Cl.
*G06T 7/20* (2017.01)
*G08B 13/196* (2006.01)

(52) U.S. Cl.
CPC .......... *G08B 13/19602* (2013.01); *G06T 7/20* (2013.01); *G08B 13/19608* (2013.01); *G06T 2207/30196* (2013.01); *G06T 2207/30241* (2013.01); *G06T 2207/30242* (2013.01); *G08B 13/19656* (2013.01)

(58) Field of Classification Search
CPC ........ G08B 13/19656; G08B 13/19602; G08B 13/196; G06T 2207/30242; G06T 2207/30241; G06T 2207/30196; G06T 7/20

See application file for complete search history.

(56) References Cited

U.S. PATENT DOCUMENTS

| | | | | |
|---|---|---|---|---|
| 7,409,076 B2 * | 8/2008 | Brown | G06K 9/00778 | 348/169 |
| 8,238,603 B1 * | 8/2012 | Golan | G06K 9/00778 | 348/169 |
| 8,630,455 B2 * | 1/2014 | Ran | G06K 9/00778 | 348/143 |
| 9,098,769 B2 * | 8/2015 | Liu | G06K 9/3241 | |
| 2007/0064115 A1 * | 3/2007 | Nomura | H04N 5/23248 | 348/208.99 |

(Continued)

FOREIGN PATENT DOCUMENTS

JP H06-223157 A 8/1994

*Primary Examiner* — Mia M Thomas
(74) *Attorney, Agent, or Firm* — Canon U.S.A., Inc. IP Division

(57) ABSTRACT

An image processing apparatus includes a generation unit, an obtaining unit, a determination unit, and a display control unit. The generation unit generates a movement trajectory of an object based on a plurality of images obtained from successive image capturing. The obtaining unit obtains setting information of a detection line for detecting passage of the object. The determination unit determines a display form of the movement trajectory according to a positional relationship of the detection line corresponding to the setting information obtained by the obtaining unit and the movement trajectory generated by the generation unit. The display control unit displays the movement trajectory on a display screen in the display form determined by the determination unit.

13 Claims, 16 Drawing Sheets

(56) References Cited

U.S. PATENT DOCUMENTS

2008/0212099 A1* 9/2008 Chen .......................... G06T 7/20
356/408
2009/0231453 A1* 9/2009 Huang ................... H04N 5/144
348/220.1
2009/0232216 A1* 9/2009 Kurata ................... H04N 5/144
375/240.16
2012/0328152 A1* 12/2012 Bamba .................. G06T 3/0062
382/103
2013/0314557 A1* 11/2013 Furukawa .............. H04N 5/225
348/208.1
2014/0119594 A1* 5/2014 Chou ....................... G07C 9/00
382/103
2014/0204240 A1* 7/2014 Bamba ............... H04N 5/23245
348/223.1
2014/0226069 A1* 8/2014 Oshima ..................... G06T 7/20
348/584
2015/0094856 A1* 4/2015 Popovic ................. B25J 9/1697
700/259
2016/0110592 A1* 4/2016 Maeda ............... G06K 9/00228
382/103
2016/0253579 A1* 9/2016 Bamba ................. G06K 9/2081
382/103
2016/0314353 A1* 10/2016 Winter ............... G06K 9/00744
2017/0091963 A1* 3/2017 Panin .................... G06T 11/005
2017/0213375 A1* 7/2017 Kobayashi .............. G06T 11/60
2018/0005071 A1* 1/2018 Idrees ................ G06K 9/00771

* cited by examiner

PASSING TRAJECTORY: 43%

(NON-SUITABLE PASSING TRAJECTORY THEREIN: 14%)

PASSING FAILED TRAJECTORY: 29%

100
101
IMAGE OBTAINING UNIT
102
MOVING OBJECT TRAJECTORY GENERATION UNIT
103
STORAGE UNIT
104
DETECTION LINE INFORMATION OBTAINING UNIT
105
DETECTION LINE PASSAGE DETERMINATION UNIT
107
SCORE CALCULATION UNIT
108
DETECTION LINE GENERATION UNIT
109
DISPLAY CONTROL UNIT

PASSING TRAJECTORY OF DETECTION LINE A

PASSING TRAJECTORY OF DETECTION LINES A AND B

PASSING TRAJECTORY OF DETECTION LINES A AND C

IMAGE PROCESSING APPARATUS TO SET A DETECTION LINE USED TO COUNT THE PASSING NUMBER OF MOVING OBJECTS

BACKGROUND OF THE INVENTION

Field of the Invention

The present invention relates to an image processing technique for counting the passing number of moving objects from successive images.

Description of the Related Art

Techniques have been conventionally discussed for capturing images in shops and/or facilities by cameras, detecting moving objects from the captured images, and counting the number of the moving objects passing through predetermined areas. Japanese Patent Application Laid-Open No. 06-223157 discusses a technique for extracting trajectories of moving objects from images captured at different times and counting the number of the moving objects by regarding that the moving objects have passed through on condition that the extracted trajectories cross a detection line (a virtual gate) set on the image.

However, for example, when the moving object is a person, there is a variety of heights and movement paths of persons, and it is difficult to set the detection line so as to appropriately cross trajectories of persons as targets of counting of the number of persons. In other words, it is difficult to set an appropriate detection line from which a counting result can be obtained as a user intended.

SUMMARY OF THE INVENTION

According to an aspect of the present invention, an image processing apparatus includes a generation unit configured to generate a movement trajectory of an object based on a plurality of images obtained from successive image capturing, an obtaining unit configured to obtain setting information of a detection line for detecting passage of the object, a determination unit configured to determine a display form of the movement trajectory according to a positional relationship of the detection line corresponding to the setting information obtained by the obtaining unit and the movement trajectory generated by the generation unit, and a display control unit configured to display the movement trajectory on a display screen in the display form determined by the determination unit.

Further features of the present invention will become apparent from the following description of exemplary embodiments with reference to the attached drawings.

DESCRIPTION OF THE EMBODIMENTS

Various exemplary embodiments of the present invention will be described in detail below with reference to the attached drawings.

The exemplary embodiments described below are examples of means to implement the present invention which can be appropriately corrected or modified according to a configuration and various conditions of an apparatus to which the present invention is applied, and the present invention is not limited to the following exemplary embodiments.

An image processing apparatus according to a first exemplary embodiment is an apparatus for supporting (assisting) determination of a detection line to be used in counting processing for counting the passing number of moving objects based on captured images. According to the present exemplary embodiment, a case is described in which a network camera constituting a monitoring system for monitoring in a shop and a facility operates as the image processing apparatus. The network camera according to the present exemplary embodiment can capture images of a predetermined imaging area and transmit captured images and a result of the counting processing executed to the captured images to a client apparatus via a network. However, the image processing apparatus is not limited to the network camera and may be a video recording server, a personal computer (PC), a smartphone, and the like.

Figure 1:
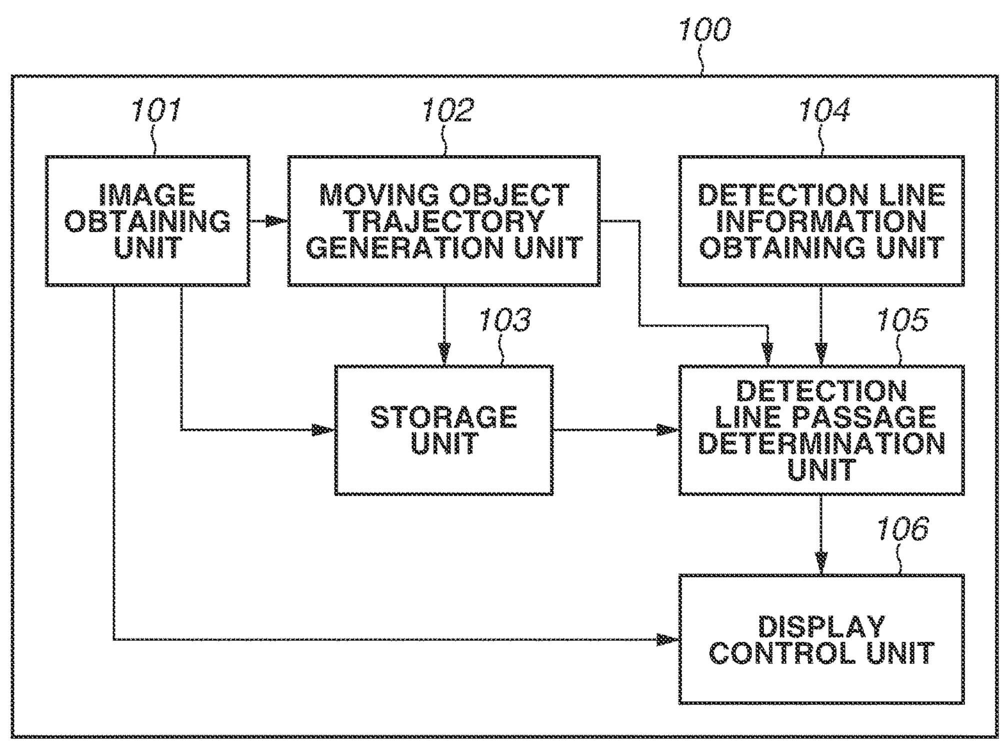
FIG. 1 is a function block diagram illustrating a configuration example of an image processing apparatus.

FIG. 1 is a function block diagram illustrating a configuration example of an image processing apparatus 100 according to the present exemplary embodiment. The image processing apparatus 100 includes an image obtaining unit 101, a moving object trajectory generation unit 102 (hereinbelow, referred to as a "trajectory generation unit 102"), a storage unit 103, a detection line information obtaining unit 104, a detection line passage determination unit 105 (hereinbelow, referred to as a "passage determination unit 105"), and a display control unit 106. The image obtaining unit 101 converts a light image formed on an imaging plane of an image capturing unit 15, described below, into a digital electric signal by photoelectric conversion, performs image processing on the digital electric signal, and obtains image data. The above-described image processing includes white balance processing, sharpness processing, tone conversion processing, and the like.

The trajectory generation unit 102 obtains a plurality of temporally successive images obtained by the image obtaining unit 101 and generates a trajectory of a moving object based on the input successive images. According to the present exemplary embodiment, a case is described in which the moving object is a person, and the trajectory generation unit 102 generates a trajectory indicating how the person in the image has moved.

The trajectory generation unit 102 first performs human body detection processing on each of a plurality of images and detects a position and a size of a person in the image. The trajectory generation unit 102 can detect a person using a method based on pattern recognition and machine learning. The trajectory generation unit 102 may use a method for detecting a moving object by a difference between a background image and a latest image and a method for combining detection of a moving object and detection of a person to detect a person. A detection result may be expressed using an arbitrary figure such as a rectangle and an ellipse.

Next, the trajectory generation unit 102 performs association processing for associating the detection results of the same person with each other based on the detection result of the moving object in each image. More specifically, the trajectory generation unit 102 can use a method for performing association in order from a group of the detection result having the highest similarity and a method for performing association so that a sum total of entire similarities is maximum. Finally, the trajectory generation unit 102 connects all of the detection results associated by the association processing with each other to generate a trajectory of the person. In this regard, the trajectory generation unit 102 connects predetermined points such as centers of gravity and the lowest points of the figures representing the detection results and generates the trajectory of the person. In this case, the trajectory of the person is expressed as a set of a plurality of line segments.

The storage unit 103 stores an image obtained by the image obtaining unit 101 and a trajectory generated by the trajectory generation unit 102. The detection line information obtaining unit 104 obtains setting information of a detection line set on an image to be used for counting the passing number of moving objects. The detection line can be expressed as a single line segment or a set of a plurality of line segments. A user can set the detection line by specifying a plurality of points on the image using a keyboard and a pointing device such as a mouse provided in the client apparatus while referring to the image displayed on a monitor (a display unit) provided in the client apparatus. The detection line information obtaining unit 104 obtains position information of the plurality of points specified by the user on the image and information of a line segment formed by the plurality of points specified by the user as the setting information of the detection line.

The passage determination unit 105 performs passage determination processing for determining whether the above-described trajectory has passed through the above-described detection line based on the trajectory generated by the trajectory generation unit 102 and the setting information of the detection line obtained by the detection line information obtaining unit 104. Every time a trajectory is generated by the trajectory generation unit 102, the passage determination unit 105 according to the present exemplary embodiment performs the above-described passage determination processing on the trajectory generated by the trajectory generation unit 102. The passage determination processing can be realized by performing intersection determination on all combinations of a plurality of line segments representing the trajectory and at least one line segment representing the detection line.

The display control unit 106 performs display control of a predetermined display device based on the determination result by the passage determination unit 105. According to the present exemplary embodiment, the display device is the display unit such as a monitor provided in the client apparatus. When the image processing apparatus 100 has a display function, the above-described display device may be the display unit provided in the image processing apparatus 100.

The display control unit 106 displays information enabling visual evaluation of the detection line obtained by the detection line information obtaining unit 104 based on the determination result by the passage determination unit 105. According to the present exemplary embodiment, the display control unit 106 displays the trajectory generated by the trajectory generation unit 102 in a form which can visually distinguish whether the trajectory is a passing trajectory which has passed through the detection line or a non-passing trajectory which has not passed through the detection line. In this case, a user can easily confirm whether the counting of the number of persons can be performed by the detection line set by the user himself or herself. In other words, the trajectory displayed with the visual distinction as described above is information enabling visual evaluation of the detection line. A display method of the trajectory is described below.

Figure 2:
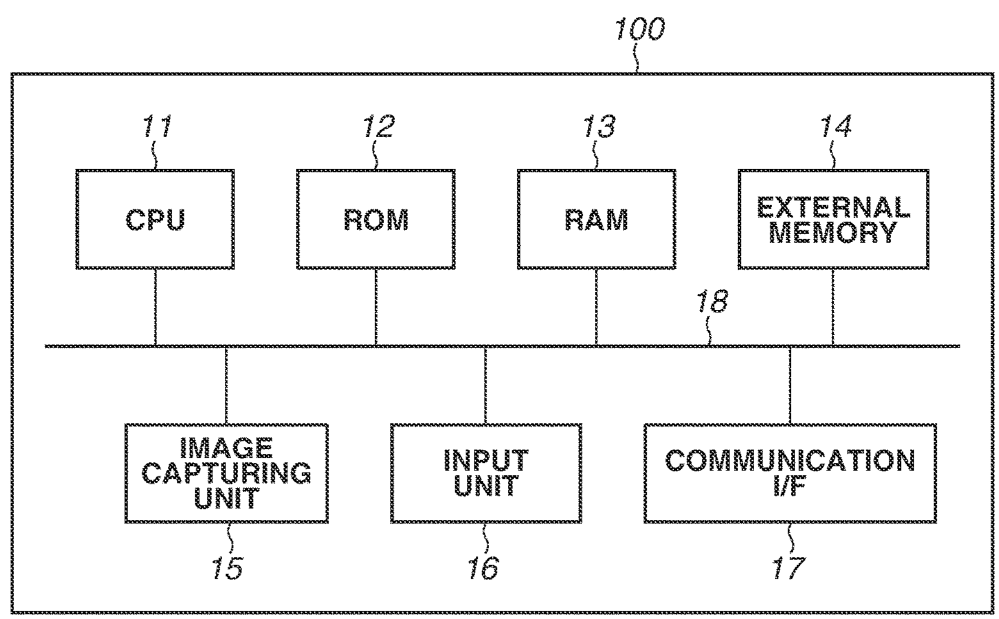
FIG. 2 is an example of a hardware configuration of the image processing apparatus.

FIG. 2 illustrates a hardware configuration of a network camera operating as the image processing apparatus 100.

The image processing apparatus 100 includes a central processing unit (CPU) 11, a read-only memory (ROM) 12, a random access memory (RAM) 13, an external memory 14, the image capturing unit 15, an input unit 16, a communication interface (I/F) 17, and a system bus 18. The CPU 11 comprehensively controls operations in the image processing apparatus 100 and controls each configuration unit (12 to 17) via the system bus 18. The ROM 12 is a nonvolatile memory for storing a program necessary for the CPU 11 to execute processing. The program may be stored in the external memory 14 and a detachable storage medium (not illustrated). The RAM 13 functions as a main memory and a work area of the CPU 11. In other words, when executing processing, the CPU 11 loads a necessary program from the ROM 12 to the RAM 13 and executes the loaded program to realize various functions and operations.

The external memory 14 stores various pieces of data and information necessary for the CPU 11 to execute processing using the program. The external memory 14 further stores, for example, various pieces of data and information obtained by the CPU 11 executing the processing using the program. The image capturing unit 15 is to capture an image of an object and includes an image sensor such as a complementary metal oxide semiconductor (CMOS) and a charge coupled device (CCD). The input unit 16 includes various setting buttons, a power button, and the like. The communication I/F 17 is an interface for communicating with the client apparatus as a communication partner. When the image processing apparatus 100 does not have an imaging function, the image capturing unit 15 is not necessary. Further, when the image processing apparatus 100 has a display function, a display unit constituted of a monitor such as a liquid crystal display (LCD) is added as a hardware configuration.

A function of each unit of the image processing apparatus 100 illustrated in FIG. 1 can be realized by the CPU 11 executing the program. However, at least a part in each unit of the image processing apparatus 100 illustrated in FIG. 1 may be configured to operate as a dedicated hardware. In this case, the dedicated hardware may be operated based on control by the CPU 11.

Next, operations of the image processing apparatus 100 are described with reference to FIG. 3. The image processing apparatus 100 realizes processing of each element illustrated in FIG. 1 and each processing illustrated in FIG. 3 by the CPU 11 reading and executing a predetermined program. However, as described above, at least a part in each element illustrated in FIG. 1 may be configured to operate as a dedicated hardware. In this case, the dedicated hardware may be operated based on control by the CPU 11.

First, in step S1, the detection line information obtaining unit 104 obtains the setting information of the detection line set by a user and advances the processing to step S2. In step S2, the image obtaining unit 101 obtains images, and the trajectory generation unit 102 generates a trajectory of a person based on the images obtained by the image obtaining unit 101. Next, in step S3, the passage determination unit 105 determines whether the trajectory generated in step S2 passes through the detection line obtained in step S1. In this regard, the passage determination unit 105 may determine additional information about the trajectory as a passage determination target generated in step S2 at the same time. The additional information is described in detail below.

In step S4, the display control unit 106 performs display control of the trajectory based on the determination result in step S3. According to the present exemplary embodiment, the display device displays the trajectory generated in step S2 using a method which can visually distinguish whether the trajectory is a "passing trajectory" which has passed through the detection line obtained in step S1 or a "non-passing trajectory" which has not passed through the above-described detection line.

Figure 4:
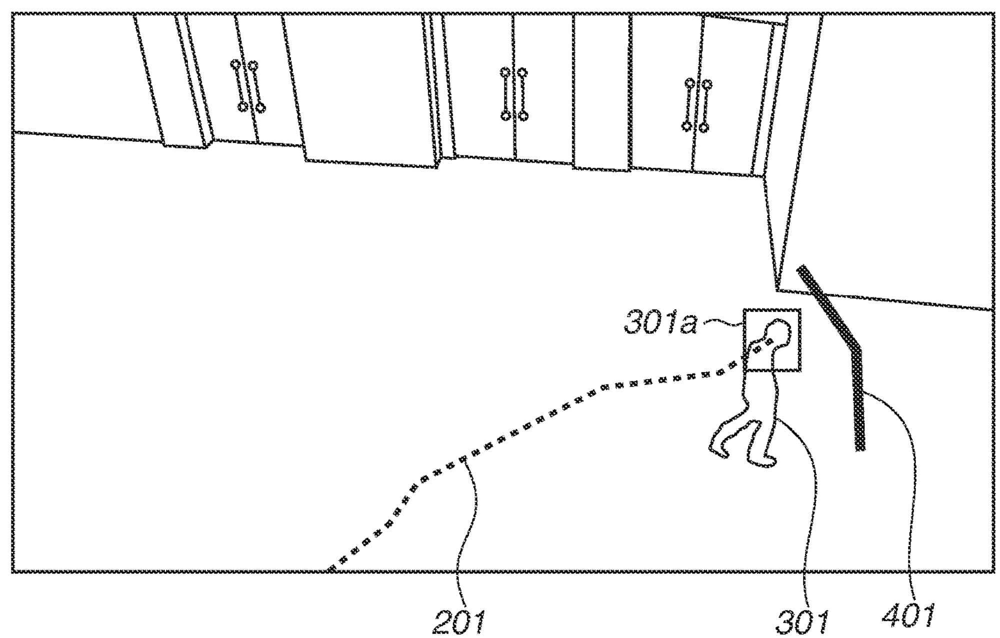
FIG. 4 illustrates a display example of a non-passing trajectory.

A trajectory 201 of a person 301 illustrated in FIG. 4 is a trajectory generated based on a detection result 301*a* of detecting a head (or an upper body) of the person 301. In the example illustrated in FIG. 4, the person 301 does not pass through a detection line 401, and the trajectory 201 does not intersect the detection line 401, so that the passage determination unit 105 determines that the trajectory 201 is a non-passing trajectory. In this case, the display control unit 106 displays the non-passing trajectory 201 with a dotted line as illustrated in FIG. 4.

Figure 5:
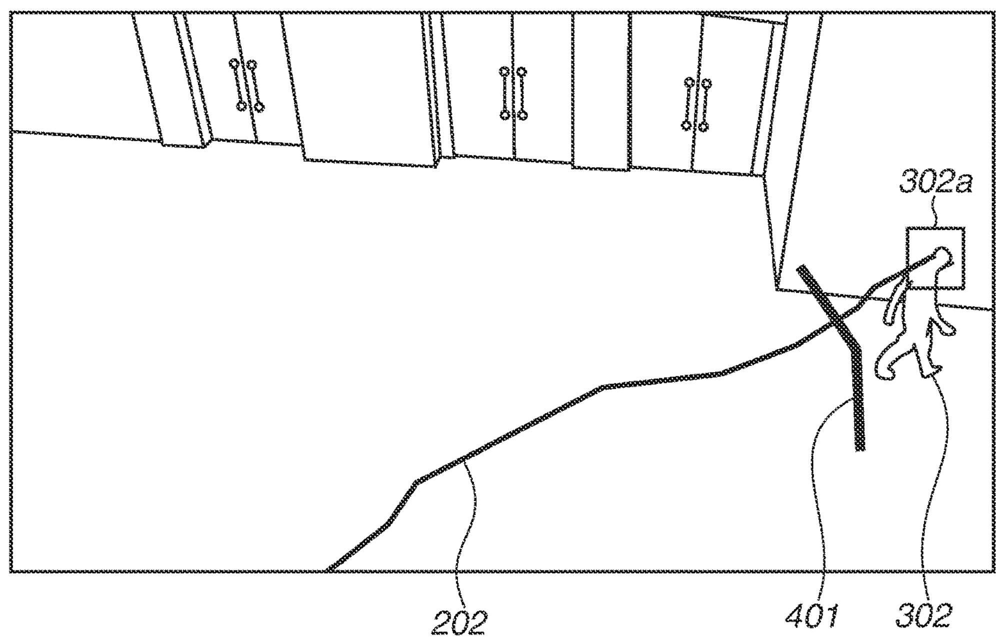
FIG. 5 illustrates a display example of a passing trajectory.

A trajectory 202 of a person 302 illustrated in FIG. 5 is a trajectory generated based on a detection result 302*a* of detecting a head (or an upper body) of the person 302. In the example illustrated in FIG. 5, the person 302 passes through the detection line 401, and the trajectory 202 intersects the detection line 401, so that the passage determination unit 105 determines that the trajectory 202 is a passing trajectory. In this case, the display control unit 106 displays the passing trajectory 202 with a solid line as illustrated in FIG. 5.

As illustrated in FIGS. 4 and 5, the passing trajectory and the non-passing trajectory are displayed in the visually distinguishable method, and thus a user can easily recognize whether counting of the number of persons can be appropriately performed as intended using the detection line set by the user himself or herself.

In addition, the passage determination unit 105 may display not only whether the trajectory is the passing trajectory which has passed through the detection line but also the trajectory in a further visually distinguishable form according to the additional information of the trajectory. The additional information is attribute information for further distinguishing each of the passing trajectory and the non-passing trajectory according to characteristics of the trajectory. The additional information is described below.

A non-passing trajectory which is a trajectory not passing through the detection line includes a "passing failed trajectory" which could be the passing trajectory passing through the detection line if the detection line is slightly shifted. The passing failed trajectory is a trajectory (a second trajectory) passing through a virtual detection line which is obtained by changing at least one of an angle, a length, and a position of the detection line obtained by the detection line information obtaining unit 104 in a predetermined range. A passing trajectory which is a trajectory passing through the detection line includes a "non-suitable passing trajectory" which may have characteristics undesirable for the counting of the number of persons. The non-suitable passing trajectory is a trajectory (a first trajectory) which is estimated as a non-suitable trajectory for a counting target of the passing number of moving objects. The non-suitable passing trajectory includes at least one of a trajectory of which an entire length is shorter than a predetermined length, a trajectory of which an angle formed by the detection line is smaller than a predetermined angle, and a trajectory intersecting an end portion of the detection line.

When the trajectory as the passage determination target is the non-passing trajectory, the passage determination unit 105 determines whether the non-passing trajectory is the passing failed trajectory or not as the additional information about the non-passing trajectory. The display control unit 106 may further display the non-passing trajectory in a form which can visually distinguish the passing failed trajectory and other non-passing trajectories according to the additional information. Further, when the trajectory as the passage determination target is the passing trajectory, the passage determination unit 105 determines whether the passing trajectory is the non-suitable passing trajectory or not as the additional information about the passing trajectory. The display control unit 106 may further display the passing trajectory in a form which can visually distinguish the non-suitable passing trajectory and other passing trajectories according to the additional information.

Figure 6:
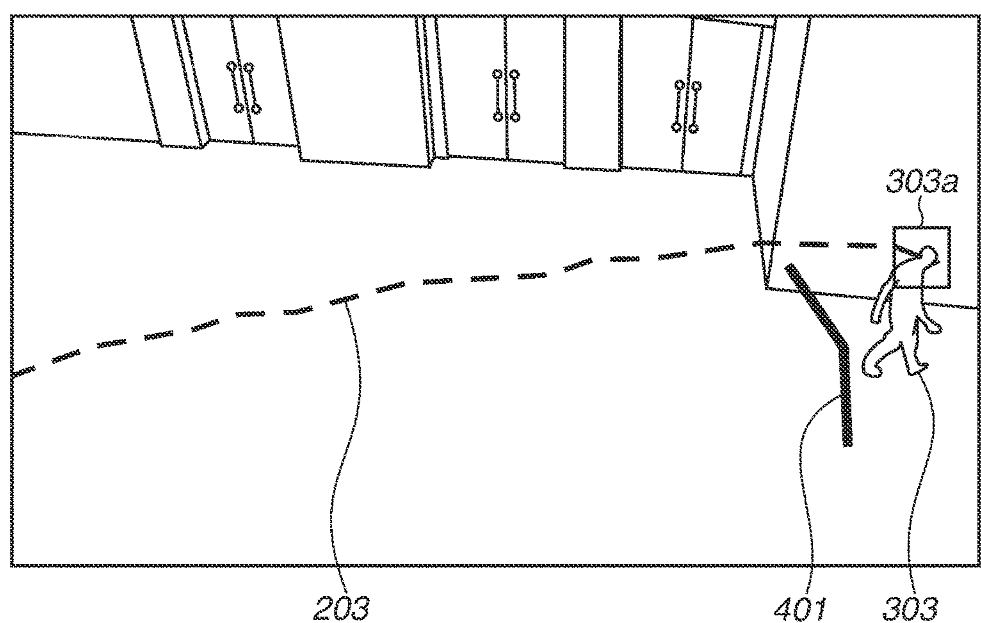
FIG. 6 illustrates a display example of a passing failed trajectory.

A trajectory 203 of a person 303 illustrated in FIG. 6 is a trajectory generated based on a detection result 303*a* of detecting a head (or an upper body) of the person 303. In the example illustrated in FIG. 6, the trajectory 203 does not intersect the detection line 401, so that the trajectory 203 is the non-passing trajectory. However, the trajectory 203 passes near the detection line 401, and if the detection line 401 is on a slightly shifted position or set slightly longer, it is highly likely that the trajectory 203 intersects the detection line 401. Thus, the passage determination unit 105 determines that the trajectory 203 is the passing failed trajectory which passes through the virtual detection line obtained by changing at least one of an angle, a length, and a position of the detection line 401 in a predetermined range.

As described above, when the generated trajectory is the passing failed trajectory, the display control unit 106 may display the passing failed trajectory 203 with a dashed line as illustrated in FIG. 6. In other words, the display control unit 106 may display the trajectory 203 as the passing failed trajectory by distinguishing from the trajectory 201 as the non-passing trajectory illustrated in FIG. 4. Accordingly, when the trajectory as the passage determination target is the non-passing trajectory, a user can easily recognize whether the trajectory is the passing failed trajectory.

Figure 7:
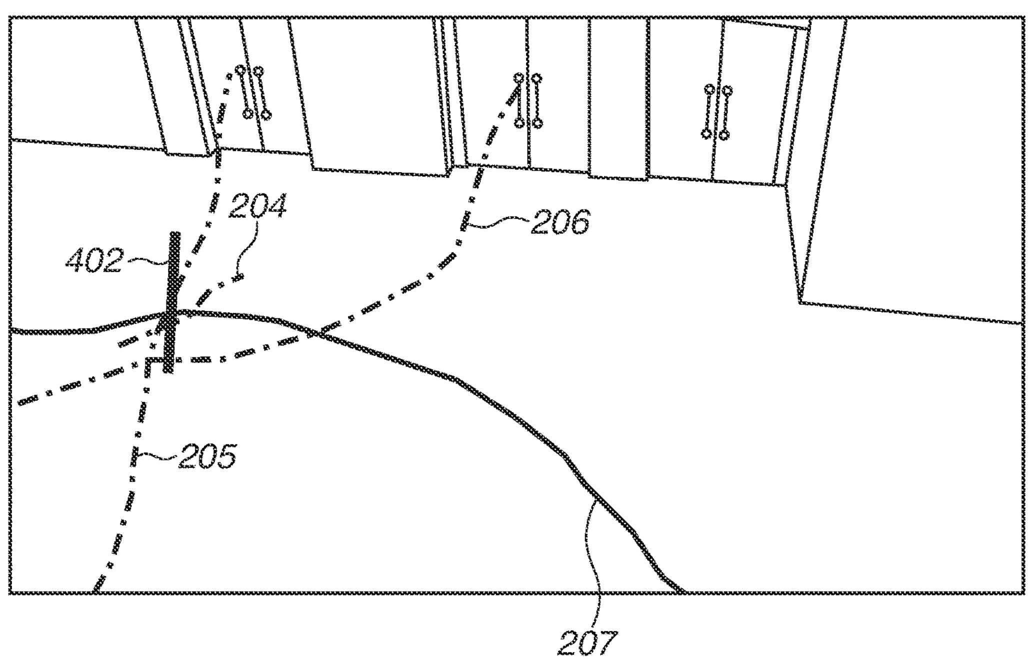
FIG. 7 illustrates non-suitable passing trajectories.

Trajectories 204 to 206 illustrated in FIG. 7 are examples of the non-suitable passing trajectories. The trajectory 204 is a trajectory of which an entire length is shorter than a predetermined length. Such a short trajectory is often generated as a result of erroneous detection and undetection in the human body detection processing. The trajectory 205 is a trajectory of which an angle formed by a detection line 402 is smaller than a predetermined angle. Such a trajectory of which an angle formed by a detection line is small tends to be erroneously determined as passed through the detection line for a plurality of times or is unstable in a direction passing through the detection line. Further, the trajectory 206 is a trajectory passing through an end portion of the detection line. With respect to such a trajectory of which an intersection point with the detection line is close to the end portion of the detection line, determination of whether the trajectory passes through the detection line may be wavered. These trajectories 204 to 206 all cause a counting result of persons to tend to be different from a true value.

According to the present exemplary embodiment, the display control unit 106 may display the non-suitable passing trajectories 204 to 206 with alternate long and short dash lines as illustrated in FIG. 7. In other words, the display control unit 106 may display the trajectories 204 to 206 as the non-suitable passing trajectories by distinguishing from the passing trajectory 207 indicated with a solid line which is not the non-suitable passing trajectory. Accordingly, when the trajectory as the passage determination target is the passing trajectory, a user can easily recognize whether the trajectory is the non-suitable passing trajectory.

The passage determination unit 105 may further finely classify the non-suitable passing trajectory according to a cause regarded as non-suitable and provide a different visual distinction for each cause. Further, the passage determination unit 105 may determine a direction that the trajectory passes through the detection line as the additional information about the passing trajectory, and the display control unit 106 may further display the passing trajectory in a visually distinguishable form according to the additional information. In other words, when the detection line is drawn in a downward direction in an image, a visual distinction may be provided in response to whether a person passes through the detection line from right to left or from left to right. Further, the method for visually distinguishing the trajectory is not limited to a method for changing a type of a line, and methods for changing thickness, color, and brightness of a line may be used. An icon, a message, and a value may be displayed to provide a visual distinction of the trajectory.

Returning to FIG. 3, in step S5, the image processing apparatus 100 determines whether to terminate the processing in FIG. 3. More specifically, the image processing apparatus 100 determines whether to wait for an appearance of a new moving object. When an appearance of a new moving object is waited (NO in step S5), the processing returns to step S2, and otherwise (YES in step S5), the processing is terminated.

As described above, according to the present exemplary embodiment, the image processing apparatus 100 obtains the setting information of the detection line set by the user, generates the trajectory of the moving object from the successive images, and determines whether the trajectory has passed through the detection line based on the generated trajectory and the obtained setting information of the detection line. Further, the image processing apparatus 100 performs the display control so as to display the trajectory which has passed through the detection line and the trajectory which has not passed through the detection line in the visually distinguishable method based on the determination result of whether the trajectory has passed through the detection line or not.

As described above, the image processing apparatus 100 performs the passage determination processing with respect to the detection line set on the image and displays information enabling visual evaluation of the detection line based on the determination result. Therefore, a user can easily recognize whether the set detection line is a detection line capable of realizing the intended counting of the number of persons.

The image processing apparatus 100 displays the trajectory in the form which can visually distinguish whether the passing trajectory or the non-passing trajectory based on the above-described determination result, and thus a user can easily confirm whether the counting of the number of persons can be performed by the set detection line. Further, since the image processing apparatus 100 displays the trajectory, and when the trajectory is the passing trajectory, a user can confirm at which point the trajectory has passed through the detection line (passed through a center portion or an end portion). Furthermore, when the trajectory is the non-passing trajectory, a user can confirm how far is a point at which the trajectory has passed through from the detection line. As described above, the image processing apparatus 100 can present a user whether the set detection line is an appropriate detection line from which a counting result intended by the user can be obtained and provide a clue about correction of the detection line to the user.

In the following case, it is difficult to draw the detection line to realize the counting of the number of persons as intended by a user. For example, a case is considered in which a user intends to set a detection line for counting the number of persons passing in front of a cash register of a shop, and a trajectory is generated by image processing based on a detection result of a person's head. In this case, the user needs to set the detection line to cross a trajectory which may be formed by a head of a person passing in front of the cash register in an imaging area. However, there is a variety of heights and movement paths of persons, and it is difficult to estimate a position of a person's head appearing in front of the cash register. Thus, the detection line set by the user does not become a detection line appropriate for counting the number of persons passing in front of the cash register in some cases. Further, it is difficult for the user to know whether the detection line set by the user is the detection line appropriate for counting the number of persons passing in front of the cash register. Therefore, trial and error is required to appropriately set a detection line used for counting the passing number of moving objects.

In addition, a trajectory of a moving object depends on results of moving object detection and human body detection and is not always generated correctly. For example, when a trajectory is generated using a detection result of a person's head, and if an object which is likely to be erroneously detected as a person's head is on a shelf in the background, a wrong trajectory tends to be generated in the vicinity of the object. Thus, if a detection line is drawn near the shelf as above described, a result of counting of the number of persons may be deviated from a true value.

In contrast, the image processing apparatus 100 according to the present exemplary embodiment can present a user whether the set detection line is the appropriate detection line from which a counting result intended by the user can be obtained as described above. Further, when an unnatural trajectory is generated due to erroneous detection in the moving object detection and the human body detection, the image processing apparatus 100 displays the trajectory of the moving object and thus can cause a user to recognize that the detection line is set to a position at which the trajectory of the moving object cannot be accurately generated. As described above, the image processing apparatus 100 can assist a user in appropriately setting a detection line used for counting the passing number of moving objects.

Further, the image processing apparatus 100 displays not only whether the trajectory has passed through the detection line but also the trajectory in a further visually distinguishable form according to the additional information about the trajectory. Therefore, when the trajectory is the passing trajectory, a user can easily confirm whether the set detection line is a detection line capable of stably and accurately counting of the number of persons. Further, when the trajectory is the non-passing trajectory, a user can easily confirm how to correct the set detection line to enable the counting of the number of persons.

In addition, every time a trajectory of the moving object is generated, the image processing apparatus 100 can perform the passage determination processing on the generated trajectory. In other words, the image processing apparatus 100 can generate the trajectory of the moving object in real time from the captured images and sequentially perform the passage determination processing. Therefore, a user can easily confirm whether the set detection line is set appropriately for a current situation (an imaging area, a time slot, and the like).

Next, a second exemplary embodiment of the present invention will be described.

According to the above-described first exemplary embodiment, the case is described in which the passage determination processing is performed, every time a trajectory of the moving object is generated, with respect to the generated trajectory. According to the second exemplary embodiment, a case is described in which the passage determination processing is performed with respect to a plurality of trajectories generated and stored in the past. In other words, the image processing apparatus 100 according to the second exemplary embodiment performs the passage determination processing and the display control using the past trajectories stored by the storage unit 103.

Figure 8:
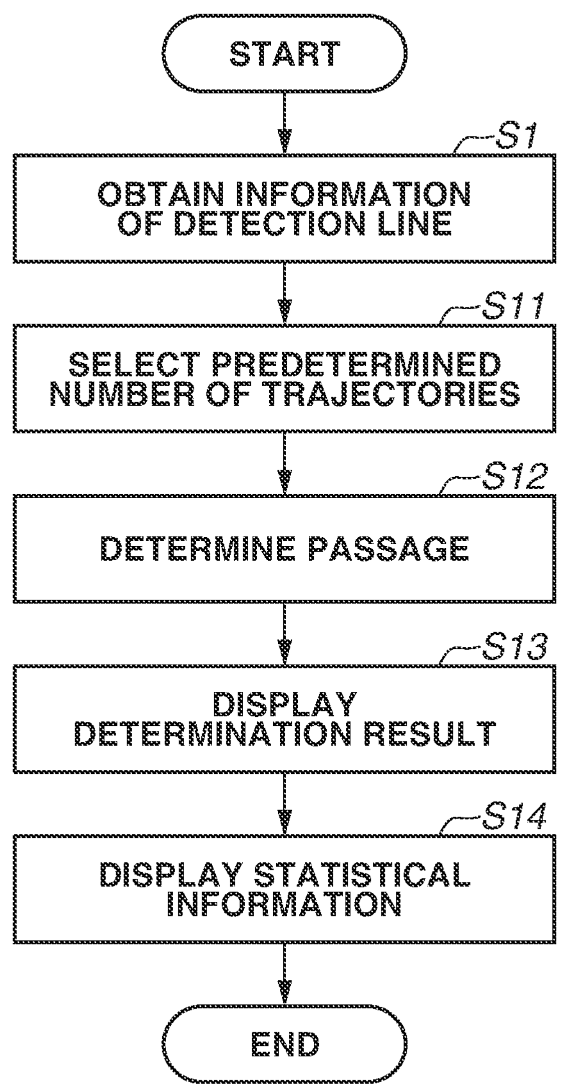
FIG. 8 is a flowchart illustrating operations of the image processing apparatus according to the exemplary embodiment.

FIG. 8 is a flowchart illustrating operations of the image processing apparatus 100 according to the second exemplary embodiment. The image processing apparatus 100 realizes processing of each element illustrated in FIG. 1 and each processing illustrated in FIG. 8 by the CPU 11 reading and executing a predetermined program. However, as described above, at least a part in each element illustrated in FIG. 1 may be configured to operate as a dedicated hardware. In this case, the dedicated hardware may be operated based on control by the CPU 11. In FIG. 8, processing similar to that in the first exemplary embodiment illustrated in FIG. 3 is denoted by the same step number, and different parts in the processing are mainly described below.

After the processing in step S1, in step S11, the passage determination unit 105 selects a predetermined number of trajectories from the past trajectories stored by the storage unit 103. An arbitrary method can be adopted to a selection method of trajectories. For example, an arbitrary positive integer n is set, and n pieces of latest trajectories may be selected or n pieces of trajectories may be randomly selected from the past trajectories. In addition, a selection method for widening a variation such as positions and lengths of trajectories may be adopted. In step S11, instead of the passage determination unit 105 to select the trajectories stored by the storage unit 103, the trajectory generation unit 102 may select past videos (successive images) stored by the storage unit 103 and generate trajectories based on the selected successive images.

Figure 3:
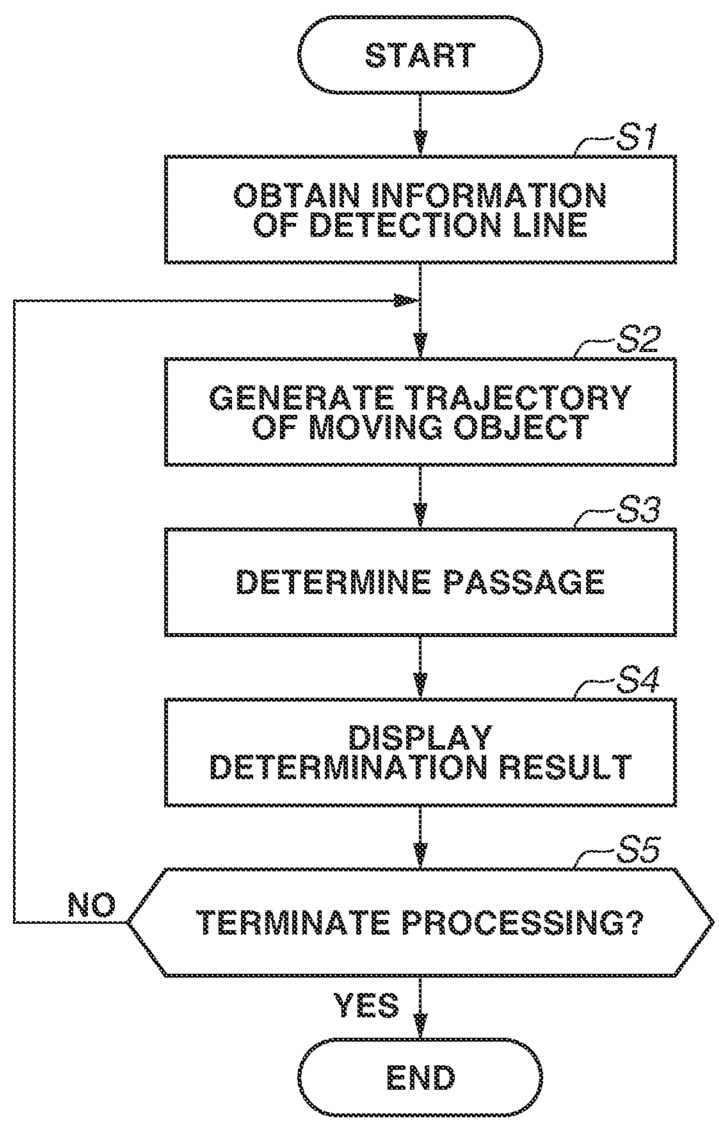
FIG. 3 is a flowchart illustrating operations of the image processing apparatus according to an exemplary embodiment.

In step S12, the passage determination unit 105 determines whether the plurality of trajectories obtained in step S11 each have passed through the detection line as with step S3 in FIG. 3 and further obtains the additional information about the trajectories. In step S13, the display control unit 106 performs the display control of the trajectories based on the determination result in step S12. According to the present exemplary embodiment, a method for displaying the n pieces of trajectories selected in step S11 in one screen is adopted. In this regard, the image processing apparatus 100 may display not only whether the trajectories have passed through the detection line but also the trajectories in further visually distinguishable forms according to the additional information about the trajectories as with the above-described first exemplary embodiment.

Figure 9:
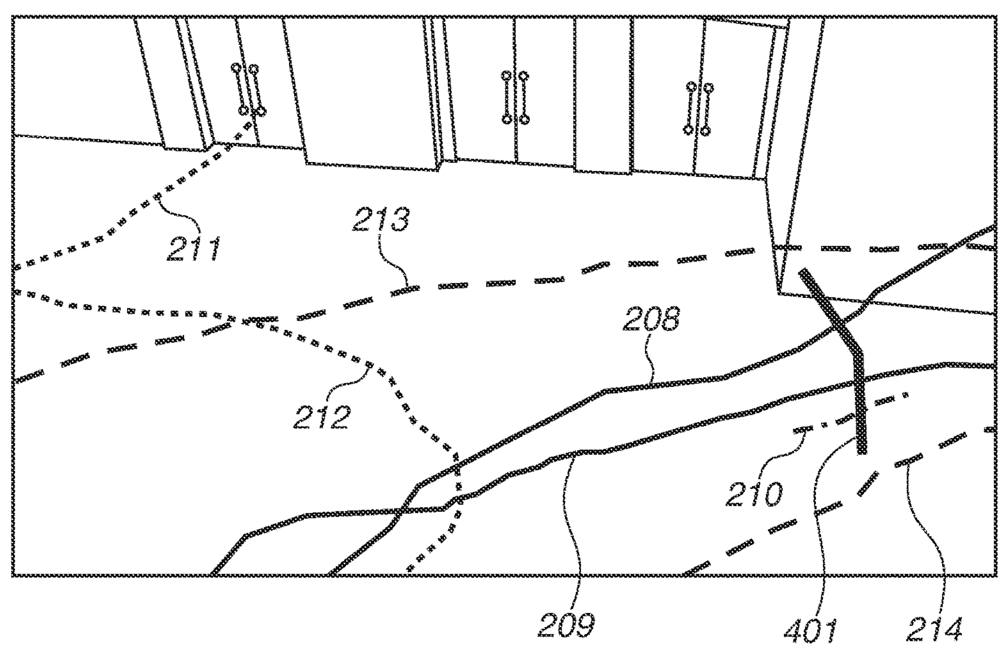
FIG. 9 illustrates a display example of trajectories according to the exemplary embodiment.

FIG. 9 illustrates a display example of trajectories. In FIG. 9, trajectories 208 and 209 which are the passing trajectories are displayed with solid lines. A trajectory 210 is also the passing trajectory but regarded as the non-suitable passing trajectory since an entire length thereof is shorter than a predetermined length. Thus, the trajectory 210 is displayed with an alternate long and short dash line so as to be distinguishable from the passing trajectories 208 and 209 which are not the non-suitable passing trajectories. Trajectories 211 and 212 are the non-passing trajectories and displayed with dotted lines. Trajectories 213 and 214 are the non-passing trajectories but regarded as the passing failed trajectories since they are trajectories which can pass through the detection line 401 if the detection line 401 is slightly extended. Thus, the trajectories 213 and 214 are displayed with dashed lines so as to be distinguishable from the non-passing trajectories 211 and 212.

Figure 10:
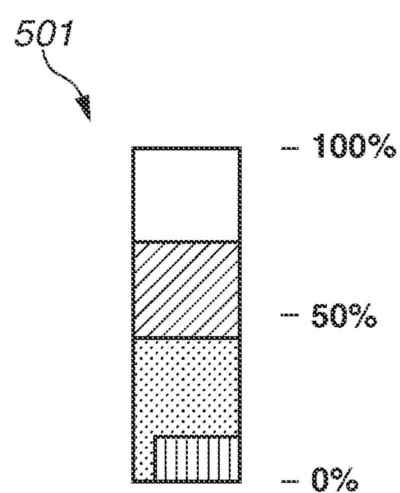
FIG. 10 illustrates a display example of statistical information of trajectories.

In step S14 in FIG. 8, the display control unit 106 performs the display control to display statistical information using the determination results of the plurality of trajectories in step S12. The statistical information is information indicating proportions of the passing trajectory, the non-suitable passing trajectory, the passing failed trajectory, and the non-passing trajectory of the trajectories selected in step S11. FIG. 10 illustrates a display example of the statistical information. FIG. 10 is an example in which the statistical information 501 is displayed in a stacked bar chart. A display method of the statistical information is not limited to the method illustrated in FIG. 10. For example, the display control unit 106 may respectively displays the number of the passing trajectories, the non-suitable passing trajectories, the passing failed trajectories, and the non-passing trajectories as the statistical information. Further, the display control unit 106 may display the statistical information in a comment such as "** % of trajectories can be detected" instead of a bar chart. Furthermore, the statistical information is not limited to information using the additional information and may be information simply indicating proportions of the passing trajectory and the non-passing trajectory.

As described above, according to the present exemplary embodiment, the image processing apparatus 100 displays the plurality of trajectories in the different forms according to characteristics of the trajectories and the statistical information about the trajectories. The statistical information using the determination result of the passage determination processing performed on the plurality of trajectories is thus displayed, a user can more easily recognize quality of the detection line. According to the present exemplary embodiment, it is described that the image processing apparatus 100 performs both of the display control of the trajectories provided with the visual distinctions and the display control of the statistical information, however, the image processing apparatus 100 may perform only either one of them. Further, the image processing apparatus 100 performs the passage determination processing on each of the plurality of past trajectories stored by the storage unit 103 and performs the display control using the determination results. Thus, the image processing apparatus 100 can quickly display information enabling visual evaluation of the detection line every time a user sets the detection line. Therefore, a user can find an appropriate detection line position in a short time. As described above, it becomes easy for a user to set the detection line which can realize the counting of the number of persons closer to the intention of the user himself or herself.

Next, a third exemplary embodiment of the present invention will be described.

According to the third exemplary embodiment, a case is described in which a score quantitatively expressing quality of a detection line set by a user is estimated, and information about the score is presented to the user. There is an issue that when drawing of the detection line set by the user is not appropriate, accuracy of counting processing of the moving object is lowered. According to the present exemplary embodiment, a score expressing the quality of the set detection line is estimated, and when the estimated score is less than a predetermined value, a warning is given or a candidate of a more appropriate detection line is suggested.

Figure 11:
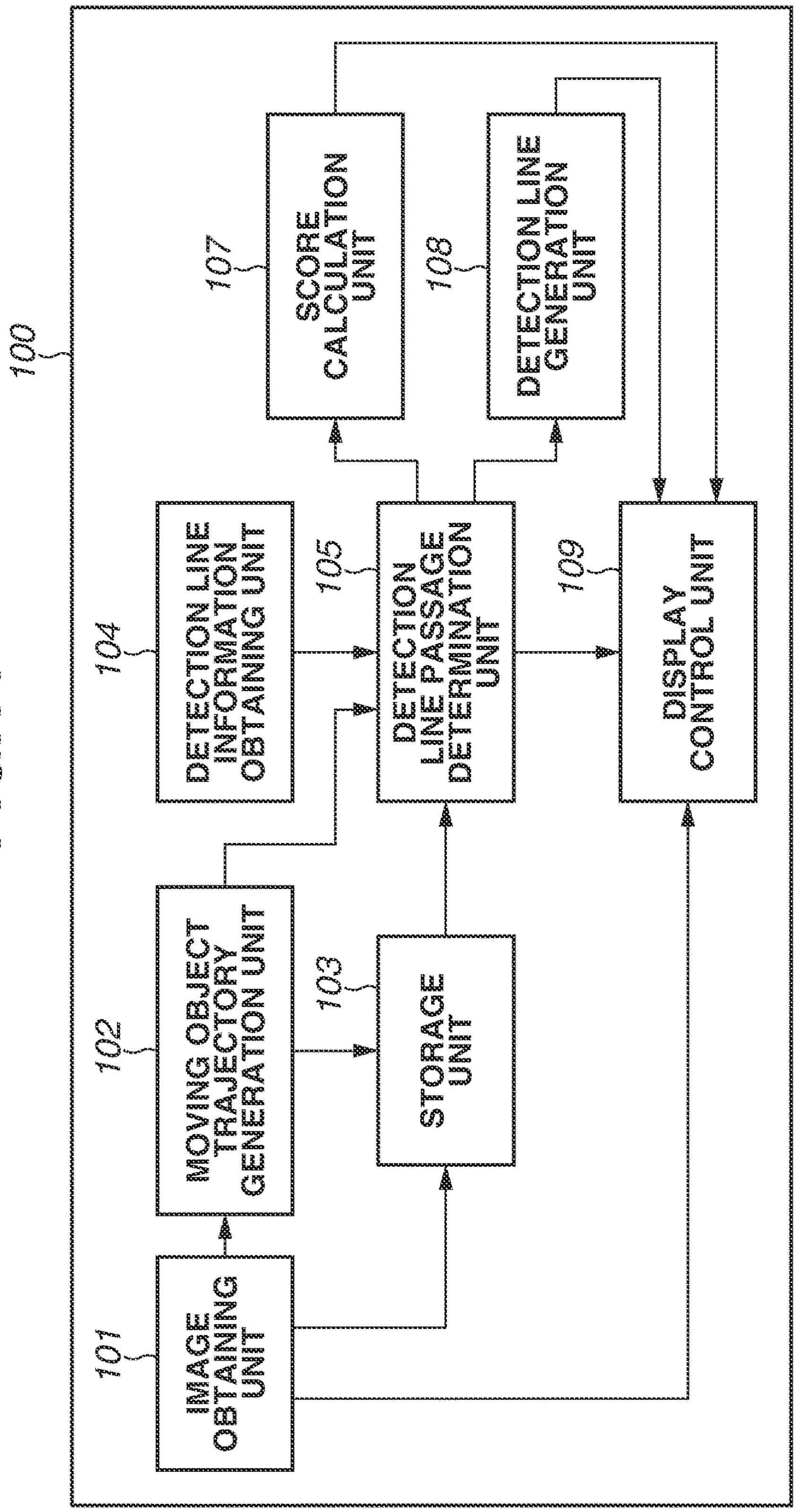
FIG. 11 is a function block diagram illustrating a configuration example of an image processing apparatus.

FIG. 11 is a function block diagram illustrating a configuration example of the image processing apparatus 100 according to the third exemplary embodiment. In FIG. 11, components the same as those in FIG. 1 are denoted by the same reference numerals, and different parts in the configuration are mainly described.

A score calculation unit 107 estimates (calculates) a score quantitatively evaluating the quality of the detection line obtained by the detection line information obtaining unit 104 based on the determination result by the passage determination unit 105. A calculation method of the score is described below. A detection line generation unit 108 generates a detection line candidate having a score higher than the score estimated by the score calculation unit 107 based on the setting information of the detection line obtained by the detection line information obtaining unit 104. A display control unit 109 performs display control to display information about the score. More specifically, the score calculated by the score calculation unit 107 and/or the detection line candidate generated by the detection line generation unit 108 may be displayed as the information about the score.

Figure 12:
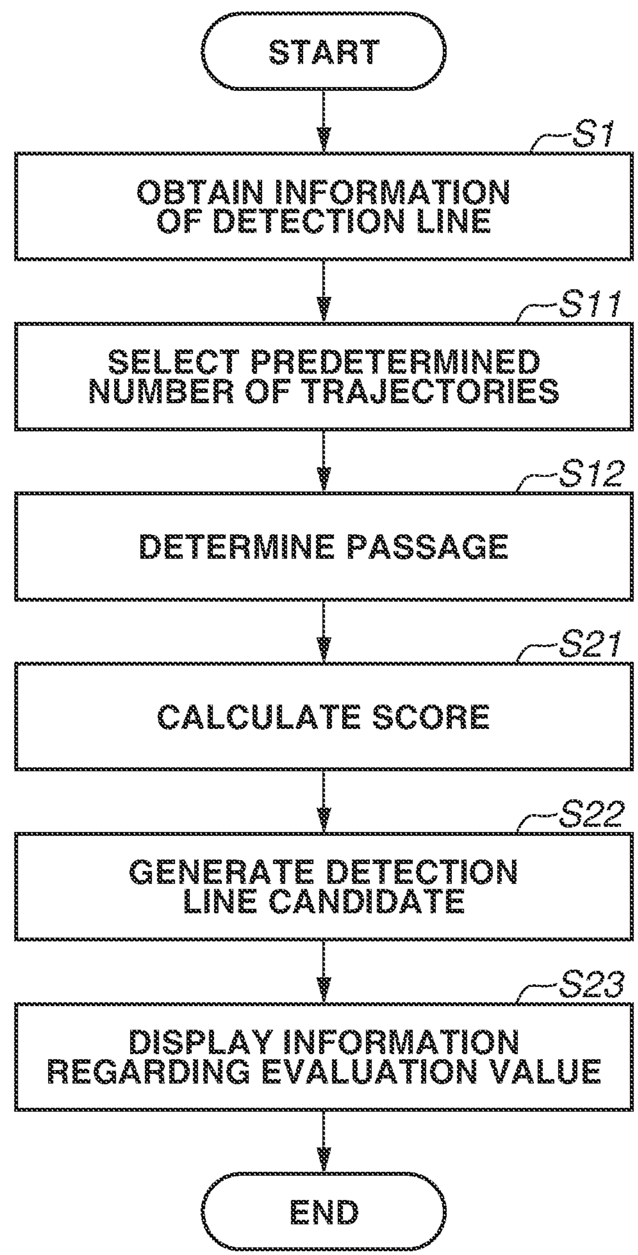
FIG. 12 is a flowchart illustrating operations of the image processing apparatus according to the exemplary embodiment.

FIG. 12 is a flowchart illustrating operations of the image processing apparatus 100 according to the third exemplary embodiment. The image processing apparatus 100 realizes processing of each element illustrated in FIG. 11 and each processing illustrated in FIG. 12 by the CPU 11 reading and executing a predetermined program. However, at least a part in each element illustrated in FIG. 11 may be configured to operate as a dedicated hardware. In this case, the dedicated hardware may be operated based on control by the CPU 11. In FIG. 12, processing similar to that in the second exemplary embodiment illustrated in FIG. 8 is denoted by the same step number, and different parts in the processing are mainly described below.

After the processing in step S12, in step S21, the score calculation unit 107 calculates a score of the detection line obtained in step S1. First, the score calculation unit 107 generates a plurality of variations such as a detection line rotated, a detection line of which a length is changed, and a detection line moved in parallel using the detection line obtained in step S1 as a reference detection line. Further, the score calculation unit 107 counts the number of passing of each detection line based on the past trajectories stored by the storage unit 103. It can be estimated that the counting result of the moving object is highly likely to be unstable as variance in the counting results is larger between the plurality of variations generated with respect to one reference detection line. Thus, in such a case, the score calculation unit 107 applies a score having a small value to the above-described reference detection line.

As another calculation method, the score calculation unit 107 first calculates a proportion of the non-suitable passing trajectories to all passing trajectories passing through the detection line obtained in step S1. It is highly likely that a short trajectory in the non-suitable passing trajectories is generated as a result of erroneous detection of the moving object. Further, a trajectory of which an angle formed by the detection line is small in the non-suitable passing trajectories tends to be erroneously determined as passed through the detection line for a plurality of times or unstable in a direction passing through the detection line. These non-suitable passing trajectories cause degradation in reliability of the counting result of the moving object. Therefore, it can be estimated that the counting result of the moving object is highly likely to be unstable as the proportion of the non-suitable passing trajectories to all passing trajectories is larger. Thus, in such a case, the score calculation unit 107 applies a score having a small value to the detection line obtained in step S1.

However, the calculation method of the score of the detection line is not limited to the above-described two methods. The score calculation method may be any calculation method as long as the detection line which can provide a more stable counting result of the moving object is applied with a score having a larger value.

Next, in step S22, the detection line generation unit 108 generates a detection line candidate which is more appropriate than the detection line obtained in step S1. First, the detection line generation unit 108 generates the plurality of variations as described above using the detection line obtained in step S1 as the reference detection line. Next, the detection line generation unit 108 calculates and quantitatively evaluates a score of each of the plurality of generated variations. Subsequently, the detection line generation unit 108 selects one or more detection lines in descending order of the score and determines the selected detection lines as the detection line candidates.

In step S23, the display control unit 109 presents at least one of the processing results in steps S21 and S22 as the information about the score to a user. When the processing result in step S21 is presented to the user, the display control unit 109 displays the score of the detection line calculated in step S21 on the display device. As described above, the display control unit 109 displays the score of the detection line and thus can inform the user about the quality of the detection line set by the user. When the score of the detection line calculated in step S21 is less than a predetermined value, the display control unit 109 may display a warning. Further, the display control unit 109 may present a ground for the score of the detection line to the user by displaying the trajectory in the visually distinguishable form. Furthermore, the display control unit 109 may display the detection line in the visually distinguishable form according to the score of the detection line.

In step S23, the display control unit 109 may suggest a more appropriate detection line to the user by displaying the detection line candidates determined in step S22. In this case, the display control unit 109 can display a user interface for enabling the user to select whether to replace the original detection line with the suggested detection line. Further, the image processing apparatus 100 may replace the original detection line with the detection line candidate without presenting the detection line candidate to the user.

Figure 13:
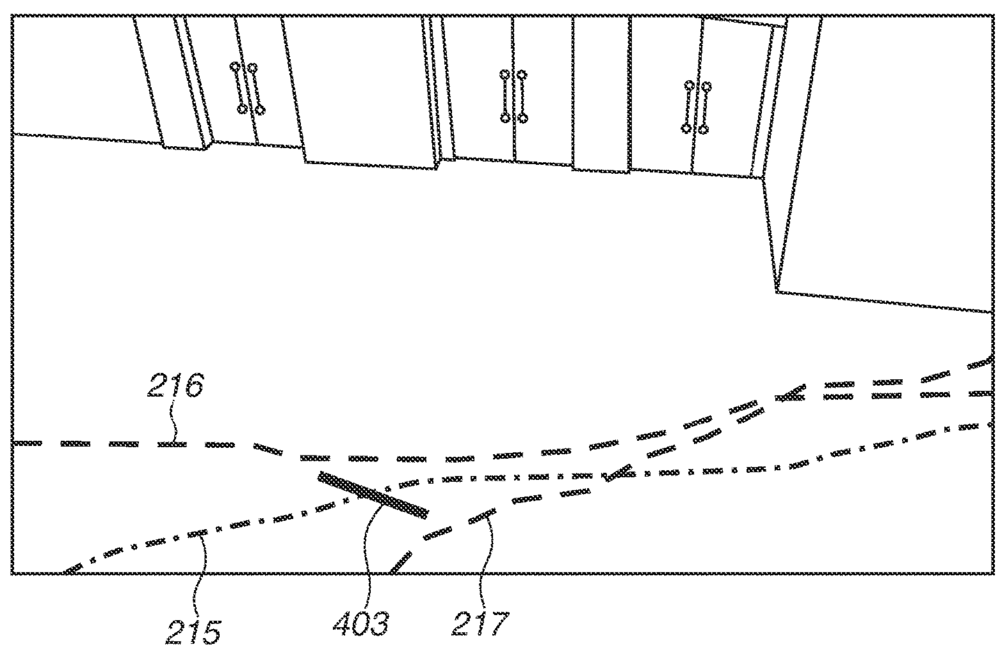
FIG. 13 illustrates an example of a determination result of past trajectories.

FIG. 13 illustrates a result that the passage determination processing of trajectories 215 to 217 stored by the storage unit 103 is performed with respect to a detection line 403 set by a user. The passing trajectory passing through the detection line 403 is only the trajectory 215 as the non-suitable passing trajectory, and the trajectories 216 and 217 as the passing failed trajectories exist near the detection line 403. In other words, the detection line 403 illustrated in FIG. 13 is not a detection line which can count the moving objects stably and highly accurately.

Figure 14:
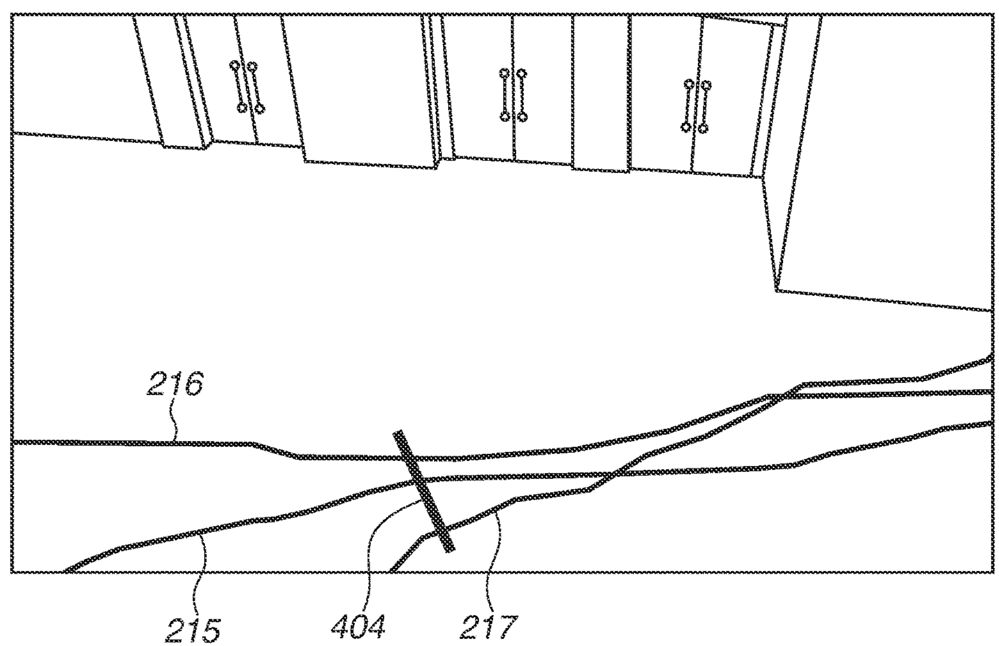
FIG. 14 illustrates an example of suggestion of a detection line candidate.

When the user set the detection line 403 illustrated in FIG. 13, the detection line generation unit 108 generates the detection line candidate having the score higher than that of the detection line 403, and the display control unit 109 displays the detection line candidate generated by the detection line generation unit 108. A detection line 404 illustrated in FIG. 14 is a detection line candidate generated based on the detection line 403. The detection line candidate 404 is a detection line obtained by executing at least one of rotation, parallel movement, and change in a length with respect to the detection line 403. More specifically, the detection line generation unit 108 generates a plurality of variations of the detection line 403 by appropriately combining processing for rotating the detection line 403 set by the user at a predetermined angle, moving the detection line 403 in parallel at a predetermined distance, and changing a length of the detection line 403 at a predetermined length. Next, the detection line generation unit 108 calculates and quantitatively evaluates a score of each variation. Subsequently, the detection line generation unit 108 selects one or more detection lines in descending order of the score as the detection line candidates. The display control unit 109 displays the detection line candidates (the detection line 404) selected by the detection line generation unit 108 as described above on the display device. As the change in the length of the detection line 403, the detection line generation unit 108 can perform either or both of the change making the length of the detection line 403 shorter and the change making the length of the detection line 403 longer. As a result of the passage determination of the trajectories 215 to 217 with respect to the detection line candidate 404, the trajectories 215 to 217 are respectively regarded as not the non-suitable passing trajectories but the passing trajectories. The suggestion method of the detection line candidate is not limited to the method illustrated in FIG. 14, and an arbitrary method can be applied.

As described above, according to the present exemplary embodiment, the image processing apparatus 100 estimates a score quantitatively evaluating the detection line and performs the display control to display information about the estimated score. Therefore, a user can easily recognize whether the set detection line is a detection line capable of realizing the intended counting of the number of persons. Further, when the detection line is set by the user, the image processing apparatus 100 generates a detection line candidate having a score higher than that of the set detection line and performs the display control to display the generated detection line candidate. Therefore, the image processing apparatus 100 can suggest more appropriate detection line to the user, and the user can easily correct the detection line.

Next, a fourth exemplary embodiment of the present invention will be described.

According to the above-described first to third exemplary embodiments, a case when a user sets one detection line is described. According to the fourth exemplary embodiment, a case when a user sets a plurality of detection lines is described. In other words, the image processing apparatus 100 according to the fourth exemplary embodiment obtains setting information pieces of a plurality of detection lines set on a screen and performs passage determination processing to determine whether a trajectory of a moving object passes through the plurality of detection lines. As described above, the image processing apparatus 100 can obtain the trajectory passing through the plurality of detection lines and thus more accurately analyze a moving trend of the moving object.

A flow of operations of the image processing apparatus 100 according to the present exemplary embodiment is similar to that of the image processing apparatus 100 illustrated in FIG. 8. However, a processing content in each step is different. The configuration of the image processing apparatus 100 according to the present exemplary embodiment is similar to that of the image processing apparatus 100 according to the second exemplary embodiment illustrated in FIG. 1.

In the processing corresponding to step S1 in FIG. 8, the detection line information obtaining unit 104 obtains the setting information pieces of the plurality of detection lines. The processing corresponding to step S11 is similar to that in the second exemplary embodiment. In the processing corresponding to step S12, the passage determination unit 105 performs the passage determination processing to determine whether each of the plurality of trajectories obtained in the processing corresponding to step S11 passes through the plurality of detection lines obtained in the processing corresponding to step S1.

Figure 15:
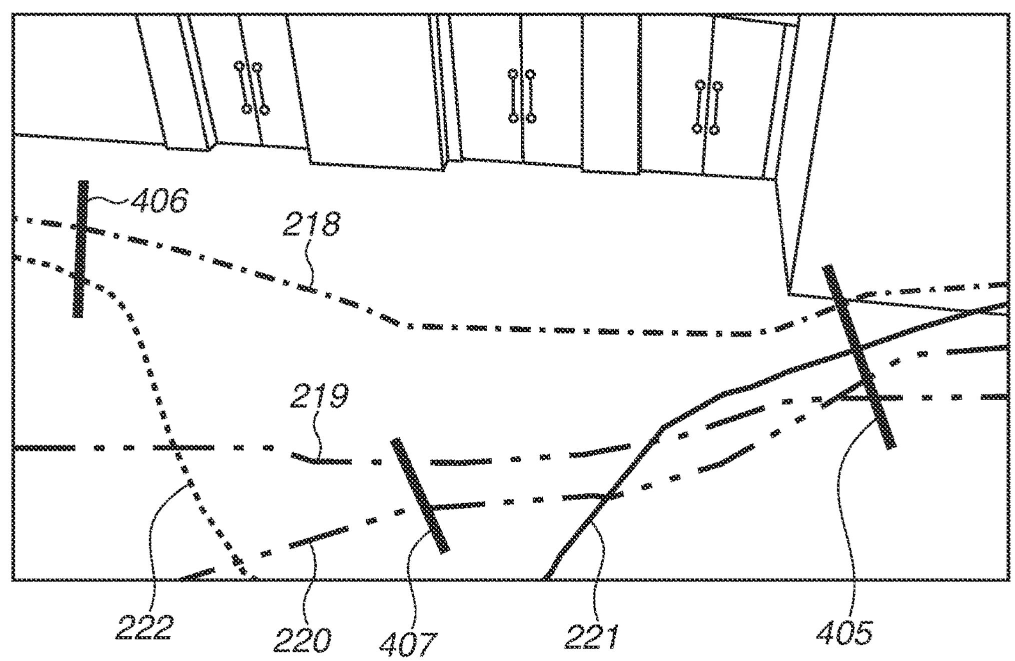
FIG. 15 illustrates a display example of a determination result of a plurality of detection lines.

In the processing corresponding to step S13, the display control unit 106 performs the display control to display determination results of the passage determination processing. FIG. 15 illustrates a display example of the determination results of the passage determination when a plurality of detection lines 405 to 407 is set by a user. In the example illustrated in FIG. 15, trajectories are classified into the following four types according to the determination results and displayed in the visually distinguishable forms.

A first trajectory is a trajectory 218 which passes through both of the detection lines 405 and 406 and is displayed with an alternate long and short dash line in FIG. 15. Second trajectories are trajectories 219 and 220 which pass through both of the detection lines 405 and 407 other than the trajectories satisfying the above-described first condition and is displayed with an alternate long and two short dashes line in FIG. 15. A third trajectory is a trajectory 221 which passes through the detection line 405 but does not pass through the detection lines 406 and 407 and is displayed with a solid line in FIG. 15. A fourth trajectory is a trajectory 222 which does not pass through the detection line 405 and is displayed with a dotted line in FIG. 15. In this regard, the method for visually distinguishing the trajectory is not limited to a method for changing a type of a line, and visual distinctions may be provided by changing thickness, color, and brightness of a line.

Figure 16:
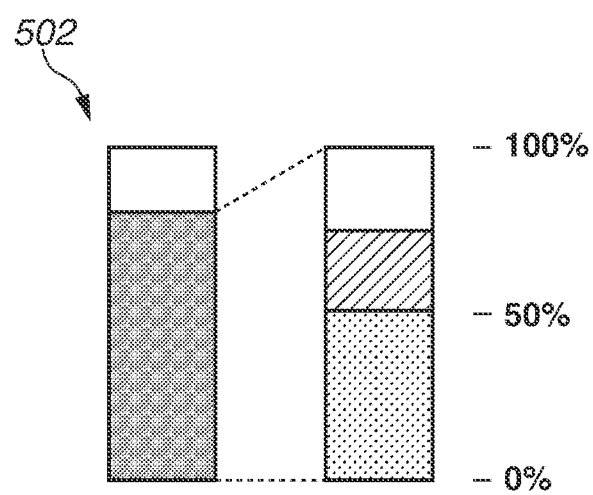
FIG. 16 illustrates a display example of statistical information of passing trajectories.

Next, in the processing corresponding to step S14, the display control unit 106 performs the display control to display statistical information on the display device. FIG. 16 illustrates a display example of statistical information 502. A bar chart on the left side of FIG. 16 indicates a proportion of the passing trajectories passing through the detection line 405 among all of the trajectories selected in the processing corresponding to step S11. A stacked bar chart on the right side of FIG. 16 indicates proportions of the trajectories classifying into any one of the above-described first trajectory and second trajectory among the passing trajectories passing through the detection line 405. In FIG. 16, the detection lines 405, 406, 407 are respectively expressed as detection lines A, B, and C.

As described above, when a plurality of detection lines is set, the image processing apparatus 100 determines whether a trajectory passes through the plurality of detection lines and performs the display control in response to the determination result. Therefore, even if a plurality of detection lines is set, the image processing apparatus 100 can display the trajectory in a different form according to characteristics of the trajectory and display the statistical information about the detection lines. Accordingly, a user can easily recognize a moving shape of the moving object and easily set the detection line which can realize the counting of the number of persons closer to the intention of the user himself or herself.

The configuration of the present exemplary embodiment can assist a user in appropriately setting a detection line used for counting the passing number of moving objects.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-154487, filed Aug. 4, 2015, which is hereby incorporated by reference herein in its entirety.

What is claimed is:

1. An image processing apparatus comprising:

a hardware processor; and a memory for storing instructions to be executed by the hardware processor, wherein, when the instructions stored in the memory are executed by the hardware processor, the image processing apparatus functions as:

a generation unit configured to generate a movement trajectory of an object based on a plurality of images obtained from successive image capturing, an obtaining unit configured to obtain setting information of a detection line for detecting passage of the object, a determination unit configured to determine a display form of the movement trajectory according to a positional relationship of the detection line corresponding to the setting information obtained by the obtaining unit and the movement trajectory generated by the generation unit, wherein the determination unit determines a display form of the movement trajectory so that display forms are different between a movement trajectory intersecting the detection line and a movement trajectory not intersecting the detection line, and a display control unit configured to display the movement trajectory on a display screen in the display form determined by the determination unit.

2. The image processing apparatus according to claim 1, wherein, when the instructions stored in the memory are executed by the hardware processor, the image processing apparatus further functions as a passage determination unit configured to determine whether the object corresponding to the movement trajectory has passed through a detection line corresponding to the setting information based on the movement trajectory generated by the generation unit and the setting information obtained by the obtaining unit, wherein the determination unit determines a display form of the movement trajectory based on a determination result by the passage determination unit so that display forms are different between the movement trajectory of the object determined as passed through the detection line by the passage determination unit and the movement trajectory of the object determined as not passed through the detection line by the passage determination unit.

3. The image processing apparatus according to claim 1, wherein, in a case where at least one of an angle, a length, and a position of the detection line is changed in a predetermined range, the determination unit determines a display form of the movement trajectory so that display forms are different between a movement trajectory intersecting the changed detection line and a movement trajectory not intersecting the changed detection line.

4. The image processing apparatus according to claim 1, wherein, when the instructions stored in the memory are executed by the hardware processor, the image processing apparatus further functions as a specifying unit configured to specify a movement trajectory satisfying a predetermined condition from among a plurality of movement trajectories intersecting the detection line, wherein the determination unit determines a display form of each of the plurality of movement trajectories so that a display form of the movement trajectory specified by the specifying unit is different from display forms of other movement trajectories among the plurality of movement trajectories.

5. The image processing apparatus according to claim 4, wherein the specifying unit specifies at least any of a movement trajectory shorter than a predetermined length, a movement trajectory of which an angle formed by the detection line is less than a predetermined angle, and a movement trajectory intersecting an end portion of the detection line as a movement trajectory satisfying the predetermined condition from among the plurality of movement trajectories intersecting the detection line.

6. The image processing apparatus according to claim 1, wherein, when the instructions stored in the memory are executed by the hardware processor, the image processing apparatus further functions as a statistics unit configured to determine statistical information based on whether each of a plurality of movement trajectories generated before the setting information of the detection line is obtained by the obtaining unit intersects the detection line corresponding to the setting information, wherein the display control unit displays the statistical information determined by the statistics unit on the display screen.

7. The image processing apparatus according to claim 1, wherein, when the instructions stored in the memory are executed by the hardware processor, the image processing apparatus further functions as a score determination unit configured to determine a score of the detection line based on whether each of a plurality of movement trajectories generated before the setting information of the detection line is obtained by the obtaining unit intersects the detection line corresponding to the setting information, wherein the display control unit displays the score determined by the score determination unit on the display screen.

8. The image processing apparatus according to claim 7, wherein, when the instructions stored in the memory are executed by the hardware processor, the image processing apparatus further functions as a candidate generation unit configured to generate a detection line candidate having a score higher than the score determined by the score determination unit based on the setting information of the detection line obtained by the obtaining unit, wherein the display control unit displays the detection line candidate generated by the candidate generation unit on the display screen.

9. The image processing apparatus according to claim 1, wherein the image processing apparatus and a display device including the display screen are connected with each other via a communication network.

10. A method for an image processing apparatus, the method comprising:

generating a movement trajectory of an object based on a plurality of images obtained from successive image capturing;

obtaining setting information of a detection line for detecting passage of the object;

determining a display form of the movement trajectory according to a positional relationship of the detection line corresponding to the obtained setting information and the generated movement trajectory, wherein determining includes determining a display form of the movement trajectory so that display forms are different between a movement trajectory intersecting the detection line and a movement trajectory not intersecting the detection line; and displaying the movement trajectory on a display screen in the determined display form.

11. The method according to claim 10, further comprising determining whether the object corresponding to the movement trajectory has passed through a detection line corresponding to the setting information based on the generated movement trajectory and the obtained setting information, wherein determining includes determining a display form of the movement trajectory based on a determination result so that display forms are different between the movement trajectory of the object determined as passed through the detection line and the movement trajectory of the object determined as not passed through the detection line.

12. A non-transitory computer-readable storage medium storing a program to cause a computer to perform a method for an image processing apparatus, the method comprising:

generating a movement trajectory of an object based on a plurality of images obtained from successive image capturing;

obtaining setting information of a detection line for detecting passage of the object;

determining a display form of the movement trajectory according to a positional relationship of the detection line corresponding to the obtained setting information and the generated movement trajectory, wherein determining includes determining a display form of the movement trajectory so that display forms are different between a movement trajectory intersecting the detection line and a movement trajectory not intersecting the detection line; and displaying the movement trajectory on a display screen in the determined display form.

13. The non-transitory computer-readable storage medium according to claim 12, the method further comprising determining whether the object corresponding to the movement trajectory has passed through a detection line corresponding to the setting information based on the generated movement trajectory and the obtained setting information, wherein determining includes determining a display form of the movement trajectory based on a determination result so that display forms are different between the movement trajectory of the object determined as passed through the detection line and the movement trajectory of the object determined as not passed through the detection line.

* * * * *